United States Defensive Publication [19] (H) [11] T989,001

Gorin [43] Dec. 4, 1979

[54] HYDROGEN DONOR SOLVENT EXTRACTION OF COAL

[75] Inventor: Everett Gorin, San Rafael, Calif.

[73] Assignee: Continental Oil Company, Stamford, Conn.

[21] Appl. No.: 969,615

[22] Filed: Dec. 14, 1978

[51] Int. Cl.[2] ..... C10G 1/00; C10G 1/06

[52] U.S. Cl. ..... 208/8 LE; 208/10

[57] ABSTRACT

A coal liquefaction process is provided in which a hydrogen donor solvent is used to at least partially liquefy the coal. The process is maintained in hydrogen donor solvent balance by treatment of products obtained in the course of the coal liquefaction process. The required balance is achieved by catalytically hydrocracking a selected portion of the relatively high boiling distillable components obtained by intensive extraction of the coal. The underlying premise is that the high boiling components of a deeply extracted coal include hydrogen donor solvents or hydrogenatable precursors thereof which may be selectively recovered by solvent fractionation to yield the desired aromatic hydrocarbons for such solvent or precursor.

1 Claim, 1 Sheet Drawing,

12 Pages Specification

The file of this unexamined application may be inspected and copies thereof may be purchased (849 O.G. 1221, Apr. 9, 1968).

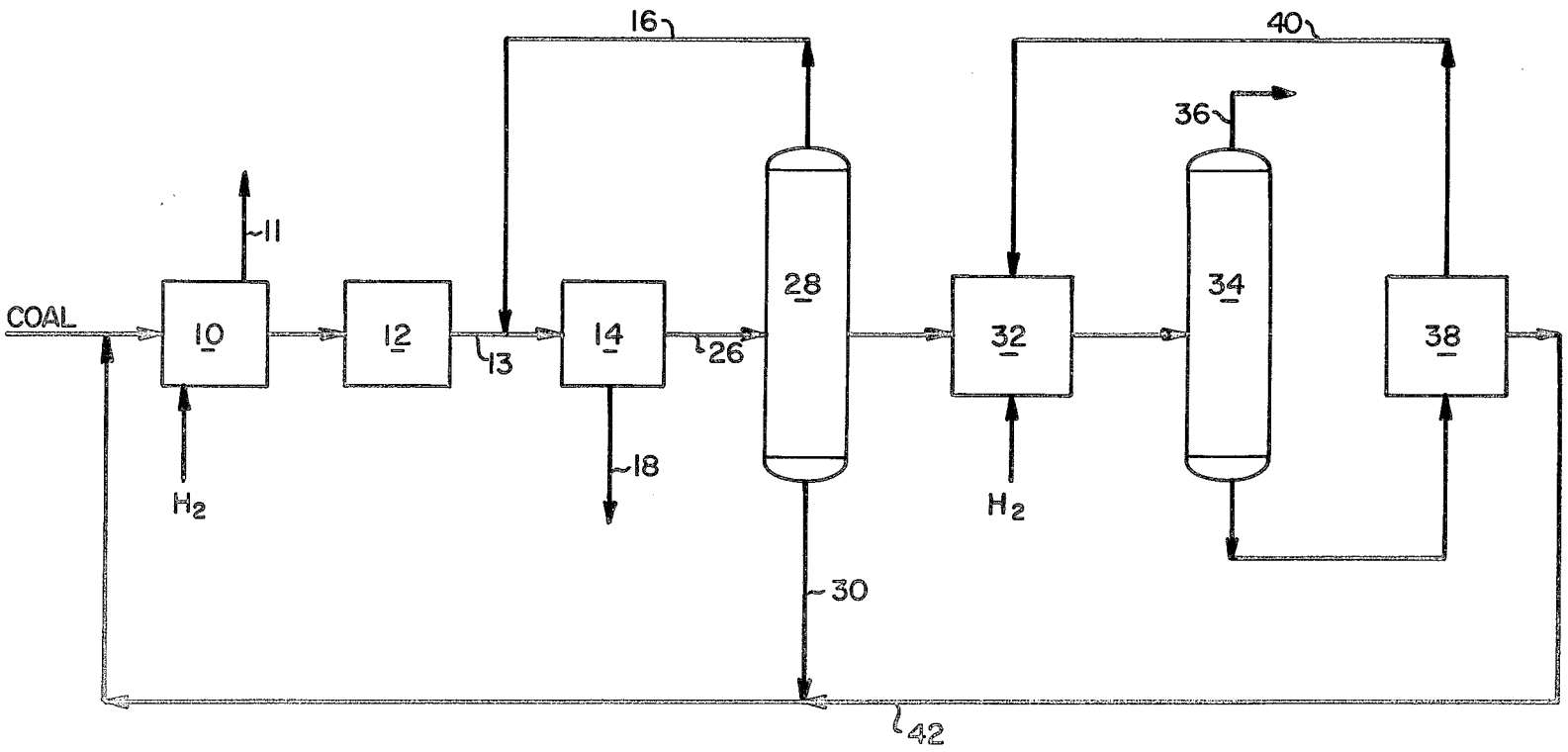
COAL
10
$H_2$
11
12
13
14
18
16
26
28
30
42
32
$H_2$
34
36
40
38